United States Patent
Wang

(10) Patent No.: US 7,280,624 B2
(45) Date of Patent: Oct. 9, 2007

(54) METHOD AND APPARATUS FOR NOISE THRESHOLD CALCULATION IN WIRELESS COMMUNICATION

(75) Inventor: Yunbiao Wang, Fremont, CA (US)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 10/651,449

(22) Filed: Aug. 29, 2003

(65) Prior Publication Data

US 2005/0047531 A1    Mar. 3, 2005

(51) Int. Cl.
*H03D 1/00* (2006.01)
*H04L 27/06* (2006.01)

(52) U.S. Cl. ............... 375/343; 375/134; 375/142; 375/143; 375/150

(58) Field of Classification Search .......... 375/134, 375/142–143, 150, 343
See application file for complete search history.

(56) References Cited

U.S. PATENT DOCUMENTS

| 4,021,808 A | 5/1977 | Spratt |
| 4,499,606 A | 2/1985 | Rambo |
| 4,653,116 A | 3/1987 | Lindenmeier et al. |
| 5,149,980 A * | 9/1992 | Ertel et al. ............. 250/559.32 |
| 5,629,639 A | 5/1997 | Williams |
| 6,163,580 A | 12/2000 | Jackson et al. |
| 2002/0151314 A1 | 10/2002 | Nohara |
| 2003/0081662 A1* | 5/2003 | Rick et al. ................... 375/150 |
| 2004/0156426 A1* | 8/2004 | Motoyoshi et al. ......... 375/150 |
| 2004/0161022 A1* | 8/2004 | Glazko et al. .............. 375/152 |

FOREIGN PATENT DOCUMENTS

| JP | 62132124 | 5/1987 |
| JP | 63188047 | 2/1990 |
| JP | 02243839 | 4/1992 |
| WO | WO 03/010553 | 2/2003 |

* cited by examiner

*Primary Examiner*—Curtis B. Odom
(74) *Attorney, Agent, or Firm*—Townsend and Townsend and Crew LLP

(57) ABSTRACT

Determination of the impulse position in a multipath channel in a noisy environment includes dynamically adjusting a threshold value when making comparisons against a signal property level.

4 Claims, 3 Drawing Sheets

METHOD AND APPARATUS FOR NOISE THRESHOLD CALCULATION IN WIRELESS COMMUNICATION

BACKGROUND OF THE INVENTION

The present invention relates to communication systems and in particular to the detection of an impulse position of a multipath channel in a noisy environment of a wireless communication system.

Impulse response measurements of a communication channel provide important information for the design of a communication system. Since the impulse response defines a system, it can be used to simulate a communication channel in order to ascertain the effects of the channel on a signal. This can be used to simulate a received signal as the transmitted is distorted through the channel by convolving the impulse response with the transmitted signal.

In a conventional spread-spectrum communication system, the information signal with a pseudo-random number (PN, also referred to a pseudo-noise) sequence to produce the transmitted signal. The received signal passed through a match filter to produce a matched signal. The matched signal is correlated with a local copy of the PN sequence to produce a correlated signal. Ideally, the matched signal comprises only the line-of-sight signal (i.e., the signal traveling along the straight-line path from transmitter to receiver), from which the impulse response of the channel over which the signal was transmitted can be determined.

The position of the channel impulse response can be used to determine the line-of-sight distance between the receiver and transmitter. The reality, however, is there are usually a multitude of objects (e.g., building, natural obstacles such as trees, hills, and so on) from which the transmitted signal can be reflected. This results in the phenomenon known as "multipath," whereby a signal can travel more than one route between the transmitter and receiver by virtue of reflections from the objects. The receiver can "see" many copies of the transmitted signal, including the line-of-sight signal and the reflected signals. The resulting impulse response therefore represents the combined effect of the multipath signals, masking the response of the line-of-sight signal.

Identifying the line-of-sight signal is made more difficult if there is an object between the transmitter and receiver, thus attenuating the signal strength. Also, at some frequencies the signal strength may attenuate or cancel due to of out-of-phase signals, or even increase if two reflected signals are in phase. The resulting impulse response would consist of multiple impulse positions of varying amplitude, thus making it difficult to identify the position of the channel impulse response of the line-of-sight signal. Another real world consideration is that if there is relative motion between the transmitter and receiver, then the path lengths of the reflected signals will vary. This produces fluctuations in amplitude and relative phase among the signals, thus making it difficult to apply conventional thresholding techniques.

It can be appreciated therefore that opportunity exists for improvements in making a quick determination of impulse position in a multipath channel.

SUMMARY OF THE INVENTION

The present invention provides a method and apparatus for identifying impulse response position in a multipath channel comprising iteratively processing the digital signal of a received transmission. With each iteration, a threshold value is computed based on the processed digital signal. The threshold value is used as the stop criterion to determine whether to continue with another iteration or to cease data processing. At each iteration, an impulse is detected and its position (time) in the signal is determined. At the end of the iterative process, the impulse that has the earliest associated time represents the time of arrival of the line of sight signal.

BRIEF DESCRIPTION OF THE DRAWINGS

Aspects, advantages and novel features of the present invention will become apparent from the following description of the invention presented in conjunction with the accompanying drawings wherein.

DESCRIPTION OF THE SPECIFIC EMBODIMENTS

Figure 1:
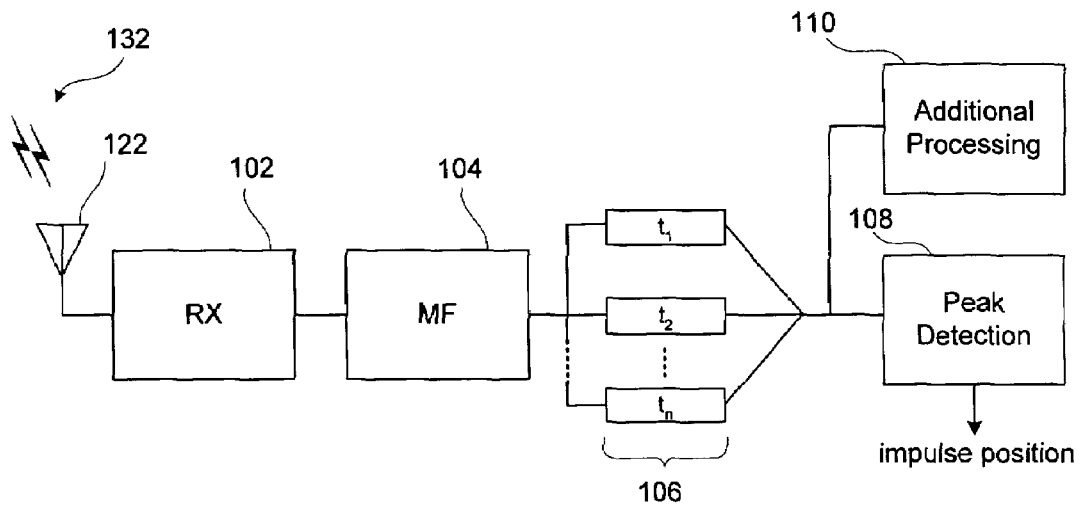
FIG. 1 is a generalized block diagram illustrating an aspect of the present invention as embodied in a communication system.

FIG. 1 is a generalized block diagram illustrating an aspect of the present invention as embodied in a communication system. A receiver component 100 of a communication system includes an antenna 122 suitable for receiving a transmitted signal 132 and presenting it to the system as a received signal. The transmitted signal is produced in a transmitter (not shown) by correlating an information signal with a set of pseudo-random number (PN, also pseudo-noise) sequences.

Receiver circuitry 102 provides an electrical interface for presenting the received signal to the downstream components. For example, the receiver circuitry might perform an appropriate conversion of the received analog signal to produce a suitable digital signal using conventional analog to digital conversion techniques.

The digital signal feeds into a match filter 104 produces a matched signal 112 which is then fed into a set of corresponding correlators 106. The correlators correlate the matched signal with a local copy of the PN sequence that was used in the transmitter (not shown). Each correlator attempts to determine the impulse response that corresponds to one of the signals (i.e., a reflected signal or the line-of-sight signal) in the received signal by correlating the matched signal with the PN sequence using a delay value. The output of each correlator is combined to produce a correlated signal 114.

The correlated signal can be subject to subsequent data processing 110 found in conventional systems. These signals can be used to perform time synchronization. In addition, after demodulation of these signals, it is possible to receive the original data. In accordance with the invention, the correlated signal is fed to a peak detection component 108. As will be explained below, the correlated signal is analyzed in the peak detection component to determine the position of the channel impulse response in the multipath channel.

Figure 2:
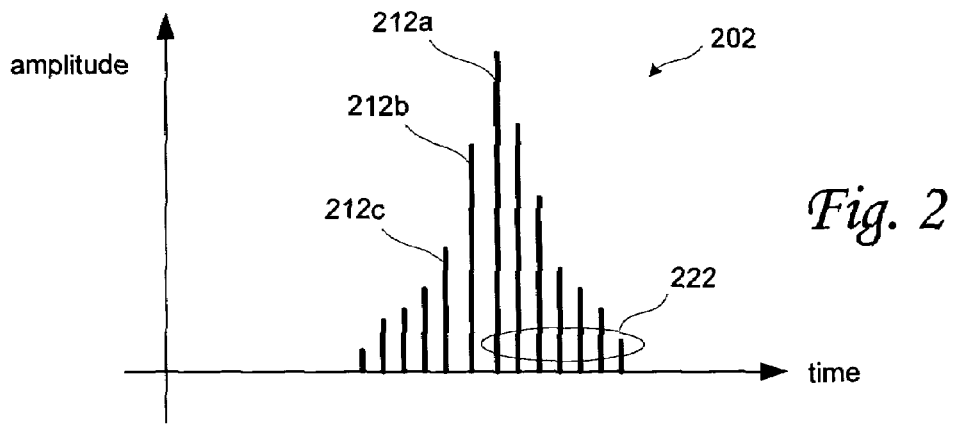
FIG. 2 illustrates a typical correlated signal 202 produced by the correlators 106 shown in FIG. 1.

FIG. 2 illustrates a typical correlated signal 202 produced by the correlators 106 shown in FIG. 1. The presence of reflections in a received signal is manifested as multiple impulses. Each pulses 212a, 212b, 212c, etc. in the correlated signal corresponds to an output of one of the correlators 106.

Figure 3:
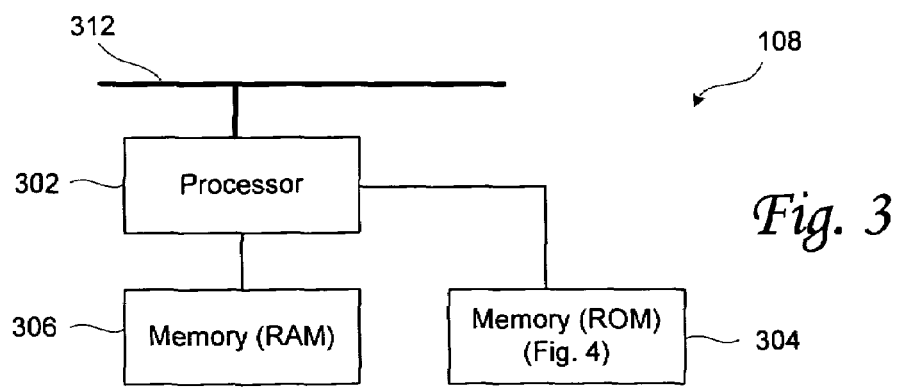
FIG. 3 is a generalized block diagram illustrating an implementation of the peak detection component 108 shown in FIG. 1.

FIG. 3 is a generalized block diagram illustrating an implementation of the peak detection component 108 shown in FIG. 1. Typically, there is a processor unit 302 such as a digital signal processor (DSP). Depending on the particular configuration, the processor unit can be a more general device such as a central processing unit (CPU), or a custom logic for performing operations specific to a given algorithm. Some form of writable memory 306 can be provided such a dynamic random access memory (RAM), or the like. In order to operate the processor, suitable control code can be provided on some form of non-volatile memory 304, such as read-only memory (ROM). Depending on the configuration and operational requirements, a re-writable memory such as FLASH RAM, static RAM, and the like can be used in place or in addition to memories 304, 306. In fact, it can be appreciated that some form of disk storage can be provided, if deemed appropriate for a given applications.

In addition to the containing the control code, the non-volatile memory 304 includes the suitably configured software to perform the peak detection processing in accordance with the present invention. This is designated by reference to FIG. 4 which flowcharts the necessary processing.

An I/O bus 312 allows the processor unit to access and provide data external to the peak detection component 108. It can be appreciated that internal data buses are included to allow data transfer among the processor and the memory components. It can be further appreciated that suitable support and control logic is provided for making the various components work, including buffering logic for receiving external data and providing it to the processor, or to memory.

Figure 4:
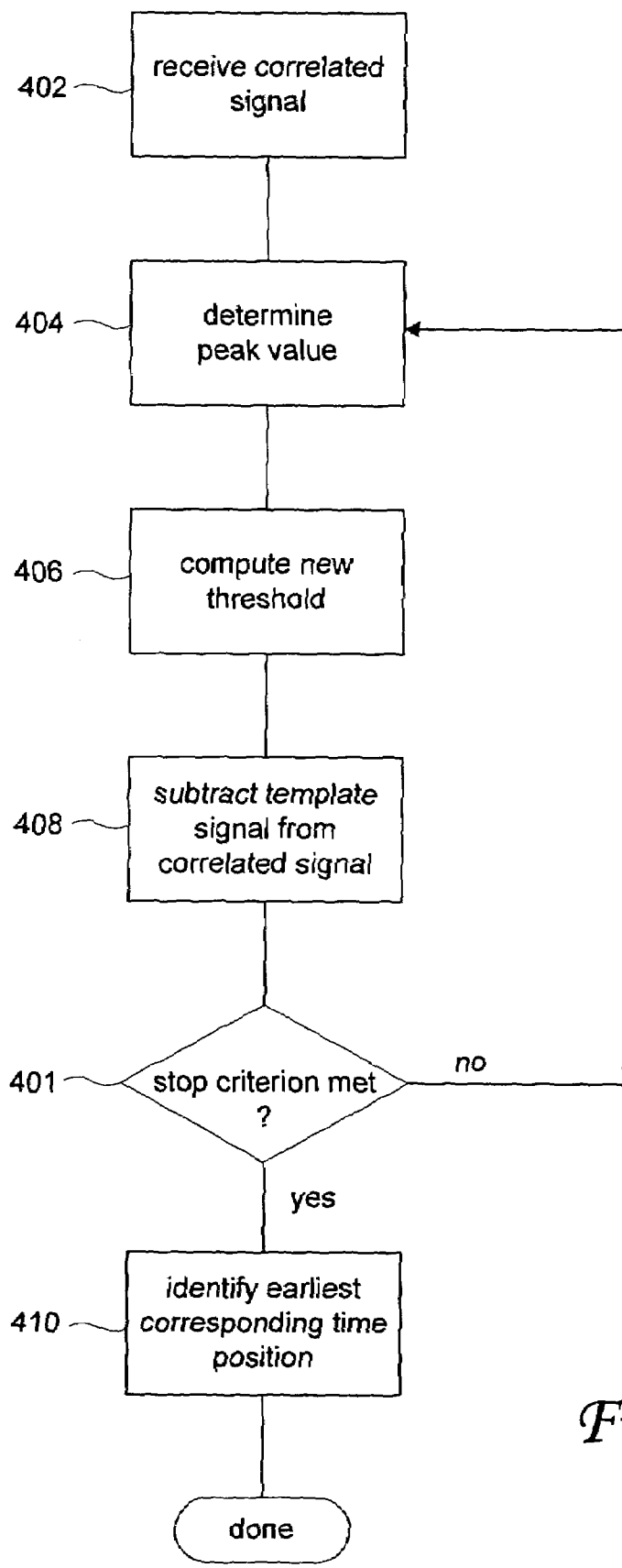
FIG. 4 is a flow chart highlighting data processing in accordance with the present application.

FIG. 4 is a flow chart which highlights the processing performed on a correlated signal in accordance with the present invention. The flow chart begins where the correlated signal 114 feeds into the peak detection component 108 shown in FIG. 1 to be evaluated. For this reason, the correlated signal can be referred to as an evaluation signal. A typical implementation of the flowchart is in the form of executable program code that can be stored in memory 304.

In spread-spectrum wireless communication systems, the PN sequence is used to spread the information signal into a wide frequency bandwidth. At the receiver, the same PN sequence is used to correlate the received signal. The correlation output will exhibit a peak in the center, plus 2N−2 side lobes, where N is the length of the PN sequence. If the peak value is N, the side lobe peak will be less than or equal to one. However, as a consequence of multipath transmissions and noise in the channel, the peak value and the side lobe peaks will not be exactly equal to N and one. Nonetheless, an aspect of the invention uses these peaks to guide the processing, which will now be discussed.

In a step 402, the peak detection unit receives a correlated signal for evaluation. As will be seen, the process is an iterative one, where the correlated signal is modified and re-evaluated. Hence, the signal that is being processed can be referred to as an evaluation signal. In a particular implementation, the evaluation signal is initially provided from an output of the correlator 106 as a stream of data. A determination of a peak value contained in the data stream is made in a step 404. This includes noting the position of the main peak in the correlator output, where the position corresponds to a time of arrival of the signal corresponding to the peak.

Figure 5A:
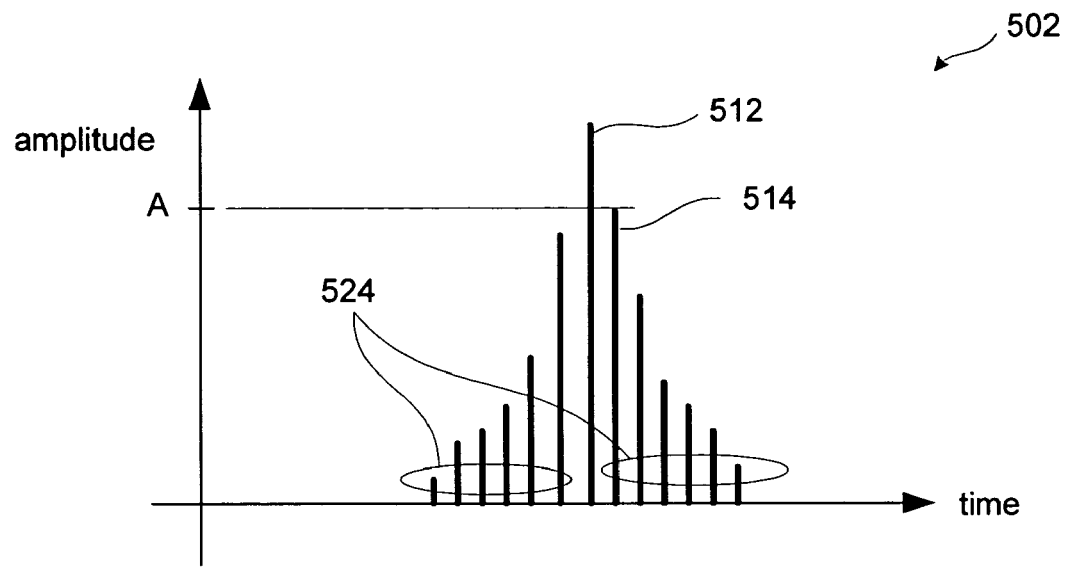
FIGS. 5A and 5B illustrate processing of a correlated signal in accordance with the invention.

Then in a step 406, a threshold value is computed. In one embodiment of the invention, the side lobe peak values about the main peak value can serve as the basis for the computation of a threshold value. In accordance with a particular implementation, the maximum side lobe peak value among the side lobe peaks about the main peak becomes the threshold value. Thus, referring for a moment to FIG. 5A, suppose the peak 512 is determined to be the main peak. Then, the side lobe peaks 524 about the main peak 512 would be considered in making the determination of the threshold value. As indicated in the figure, the side lobe peak 514 has the highest value among the side lobe peaks and thus would be selected as the threshold value, according to this particular implementation of step 406.

In accordance with another implementation of step 406, the threshold value can be computed as a function of the main peak value. For example, the threshold value can be computed as $$\frac{1}{N} \times P + C,$$

where P is the determined peak value, N is the number of side lobes about the main peak, and C is constant.

Still another implementation is to compare the main peak value against each side lobe peak value. If any side lobe peak value is at least N times smaller than the main peak value, then the peak value for that side lobe is used as the threshold value. Still another implementation it to take an average of the peak values of the side lobes about the main peak. Thus, $$\frac{\sum_{i=0}^{N-1} w_i s_i}{N-1},$$

where $s_i$ is the peak value for the $i^{th}$ side lobe, $w_i$ is a weighting factor (0-1.0), and there are N−1 side lobes. It can be appreciated from the foregoing that other criteria for computing a threshold value are possible. It is noted that this aspect of the invention does not lie with the particular computation of the threshold value, but rather with the fact that the threshold value is adjusted for each iteration of steps 404, 406, and 408.

Figure 5B:
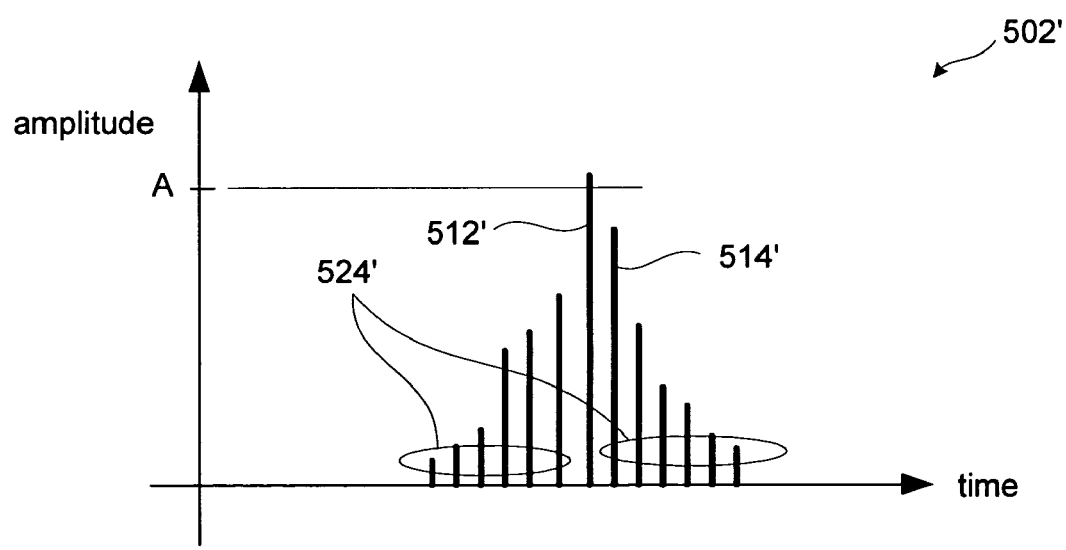

In a step 408, a template signal is subtracted from the correlated signal to produce a new evaluation signal. The template signal is produced by correlating a pulse in the information signal with itself (autocorrelation). The template signal may include positive- and negative-going pulses. FIG. 5B shows a result of performing a subtraction of the template signal from the correlated signal 502 of FIG. 5A to produce new signal 502'. It is noted that some of the peaks will increase in amplitude or decrease, depending on the pulses in the template signal.

Then in a decision step 401, the threshold value is used to determine whether to perform another iteration. The threshold is compared against the peak values in the new evaluation signal 502'. If one of the peak values exceeds the threshold value, then another iteration of steps 404-408 is performed on the new signal. This includes identifying a main peak value in the new signal and its corresponding position, step 404. A new threshold value is computed based on the new signal, step 406. Finally, the template signal is subtracted from the new signal to produce yet another new signal, step 408. The threshold value is compared against the new signal, in decision step 401. If one of the peaks in the new signal exceeds the re-computed threshold, then again the steps 404-408 are repeated. In this way, a list of peak values and their corresponding positions (time of occurrence) is compiled. Also, as noted above, the threshold value is re-computed with each iteration, so that the threshold value is a dynamically adjusted quantity.

The iterative processing completes when there is no peak value that exceeds the threshold value. At that point, the list of times of occurrences of peak values is searched for the earliest time. This represents the time of travel of the line of sight signal, and thus can be used to compute the line of sight distance between the transmitter and the receiver. In accordance with another aspect of the invention, the list of times can be sorted in increasing or decreasing order.

It is noted that the search time can be improved if the goal is to find only the arrival time of the line of sight signal; i.e. the first arrival time. Since the first arrival signal is either the main peak of the correlated signal, or in front of the main peak, then the algorithm need only be performed on the main peak value and peak values of the side lobes that are in front of the main peak. Referring to FIG. 2, the search space would then comprise only the peaks 222.

What is claimed is:

1. A signal detection method comprising:
   (a) receiving a transmitted signal as a received signal, the transmitted signal comprising a first signal correlated with a pseudo-random number sequence, the first signal representative of an information signal, the received signal comprising one or more reflected signals and a line-of-sight signal;
   (b) producing a matched signal from the received signal;
   (c) correlating the matched signal with the pseudo-random number sequence to produce a correlated signal, the correlated signal comprising a main lobe and a plurality of side lobes;
   (d) determining a peak value of the main lobe;
   (e) determining a time value associated with the peak value of the main lobe;
   (f) determining a threshold value based on the correlated signal; and
   (g) if one of peak value of the main lobe and the plurality of side lobes exceeds the threshold value, then subtracting a template signal from the correlated signal to produce a new signal and repeating the steps (c)-(g) with the new signal, wherein the threshold value is recomputed with each iteration of the steps (c)-(g),
   wherein a plurality of time values are produced by the repetition of steps (c)-(g), and
   wherein the smallest of the time values represents the arrival time of the line-of-sight signal.

2. The method of claim 1 wherein the first signal is the information signal.

3. The method of claim 1 wherein the threshold value is based on peak values of the side lobes.

4. The method of claim 1 wherein the threshold value is based on a ratio between the peak value of the main lobe and a peak value of each side lobe.

\* \* \* \* \*